United States Patent [19]

Yomogida et al.

[11] 4,425,630

[45] Jan. 10, 1984

[54] SEQUENCE INSTRUCTION DISPLAY SYSTEM

[75] Inventors: Toshihiko Yomogida, Kariya; Tsuyoshi Yokota, Okazaki; Haruhisa Tsuji, Nagoya, all of Japan

[73] Assignee: Toyoda Koki Kabushiki Kaisha, Aichi, Japan

[21] Appl. No.: 302,765

[22] Filed: Sep. 16, 1981

[30] Foreign Application Priority Data

Sep. 29, 1980 [JP] Japan ............................. 55/135646

[51] Int. Cl.[3] .......................................... G06F 15/00
[52] U.S. Cl. ................................. 364/900; 364/141; 364/146
[58] Field of Search ... 364/200 MS File, 900 MS File, 364/131, 140, 141, 144, 146

[56] References Cited

U.S. PATENT DOCUMENTS

| | | | |
|---|---|---|---|
| 3,964,026 | 6/1976 | Yamauchi et al. | 364/900 |
| 4,007,028 | 2/1977 | Bublitz et al. | 364/146 |
| 4,063,311 | 12/1977 | Jeremiah et al. | 364/900 |
| 4,228,495 | 10/1980 | Bernhard et al. | 364/200 |
| 4,276,610 | 6/1981 | Fleck | 364/144 |
| 4,279,012 | 7/1981 | Beckerdorff et al. | 364/146 |
| 4,281,379 | 7/1981 | Austin | 364/200 |
| 4,298,958 | 11/1981 | Takaki et al. | 364/900 |
| 4,316,260 | 2/1982 | Hideshima et al. | 364/900 |
| 4,328,539 | 5/1982 | Heeger | 364/146 |
| 4,371,922 | 2/1983 | Fujita et al. | 364/144 |

*Primary Examiner*—Charles E. Atkinson
*Assistant Examiner*—Gary V. Harkcom
*Attorney, Agent, or Firm*—Oblon, Fisher, Spivak, McClelland & Maier

[57] ABSTRACT

A sequence instruction display system used with a programmable sequence controller for displaying a desired sequence instruction and the on-off state of the input or output element corresponding thereto. A data processor stores the address data of an input element in an input address register when the on-off state thereof and an input instruction corresponding thereto are displayed. The data processor, when a signal is applied thereto, searches a program storage area for an output instruction having the address data which is stored in the input address register and further searches for an input instruction which concerns the energization of the output element corresponding to the output instruction to thereby enable the operator to find a desired sequence instruction by a simple manipulation.

6 Claims, 18 Drawing Figures

| | | |
|---|---|---|
| N-1 | YON | 90 |
| N | TNA | 10 |
| N+1 | TNA | 150 |
| N+2 | TFA | 25 |
| N+3 | YON | 100 |
| | TNA | 26 |
| ⋮ | ⋮ | |
| M-1 | YON | 140 |
| M | TNO | 30 |
| M+1 | TNE | 40 |
| M+2 | TFA | 50 |
| M+3 | YON | 150 |

Fig. 8

| |
|---|
| PSA |
| IAR |
| OAR |
| FA |
| FB |
| FC |
| FD |
| |

SEQUENCE INSTRUCTION DISPLAY SYSTEM

BACKGROUND OF THE INVENTION

1. Field of the Invention

The present invention generally relates to a sequence instruction display system used with a sequence controller for displaying a sequence instruction and the on-off state of the corresponding input or output element.

2. Description of the Prior Art

A sequence controller automatically controls a controlled-objective such as a machine tool in accordance with a sequence program, which includes a large number of sequence instructions. The prior art display system is capable of displaying desired sequence blocks, each of which is made up on one output element and several input elements, and further displaying the on-off state of the elements. Such a system is disclosed in U.S. Pat. No. 3,964,026 to Nobuharu Yamauchi et, al. Using the prior art display system, an operator can check a sequence block when a machine trouble has occurred or, in other words, when an output element has not been energized. However, it is sometimes difficult to determine the cause of the machine trouble or an input element which concerns the energization of the output element, because an input element which is included in a sequence block may act as an output element in another sequence block, and therefore, the on-off state of such an input element may depend on the on-off states of other elements.

For this reason, it is necessary to check many sequence blocks, one after another, which concern the energization of the output element. However, when the prior art display system is used, the operator, after checking a sequence block, is required to repeat the previous manipulation, that is, the designation of the address data, for displaying a related sequence block. He must memorize the address data or look up the sequence circuit. For example, in the case of the sequence blocks shown in FIGS. 4 and 5, wherein an input element C12 in a first sequence block acts as an output element 02 in a second sequence block, if an output element 01 is not energized because of the off state of the input element C12, the operator has to designate the address data 150 of the output element 02 in order to display the second sequence block and to check which one of input elements C21, C22 and C23 prevents the energization of the output element 02 and further the output element 01.

Therefore, it is desirable to simplify the manipulation for displaying a desired sequence block or a sequence instruction.

SUMMARY OF THE INVENTION

Accordingly, it is a primary object of the present invention to provide an improved display system which is capable of displaying a sequence instruction by a simple manipulation to thereby enable an operator to determine quickly the cause of a machine trouble of an input element which prevents the energization of an output element.

Another object of the present invention is to provide an improved display system as set forth above which is capable of displaying a sequence instruction and the on-off state of the input or output elements corresponding thereto.

Another object of the present invention is to provide an improved display system as set forth above which is capable of indicating whether the on-off state of an input element is satisfied with the test command of the corresponding input instruction.

Briefly, according to the present invention, these and other objects are achieved by providing a sequence instruction display system for displaying input and output instructions. The system is used with a sequence controller which includes a program memory for storing a sequence program composed of a plurality of input and output instructions. A data processor is connected to the sequence controller. A buffer memory is connected to the data processor and has a program storage area, an input address register and an output address register. The data processor is capable of performing the following functions:

(1) read out function: for reading out the sequence program from the program memory and for storing the same in the program storage area;

(2) output address data storing function: for storing the address data of an output instruction to be displayed in the output address register;

(3) first output instruction searching function: for searching the program storage area for the output instruction which has the address data stored in the output address register;

(4) input instruction searching function: for searching the program storage area for an input instruction, an input element corresponding to which input instruction concerns the energization of an output element corresponding to the output instruction, and for storing the address data of the input instruction in the input address register;

(5) second output instruction searching function: for transferring the content of the input address register to the output address register to thereby search the program storage area for an output instruction which has the address data stored in the input address register;

(6) displaying function: for displaying the input or output instruction searched by the data processor; and (7) on-off state read out function: for reading out the on-off state of the input or output element corresponding to the displayed input or output instruction.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which:

FIGS. 6(a) throught 6(f) show sequence instructions displayed on the display system;

DETAILED DESCRIPTION OF PREFERRED EMBODIMENTS

Figure 1:
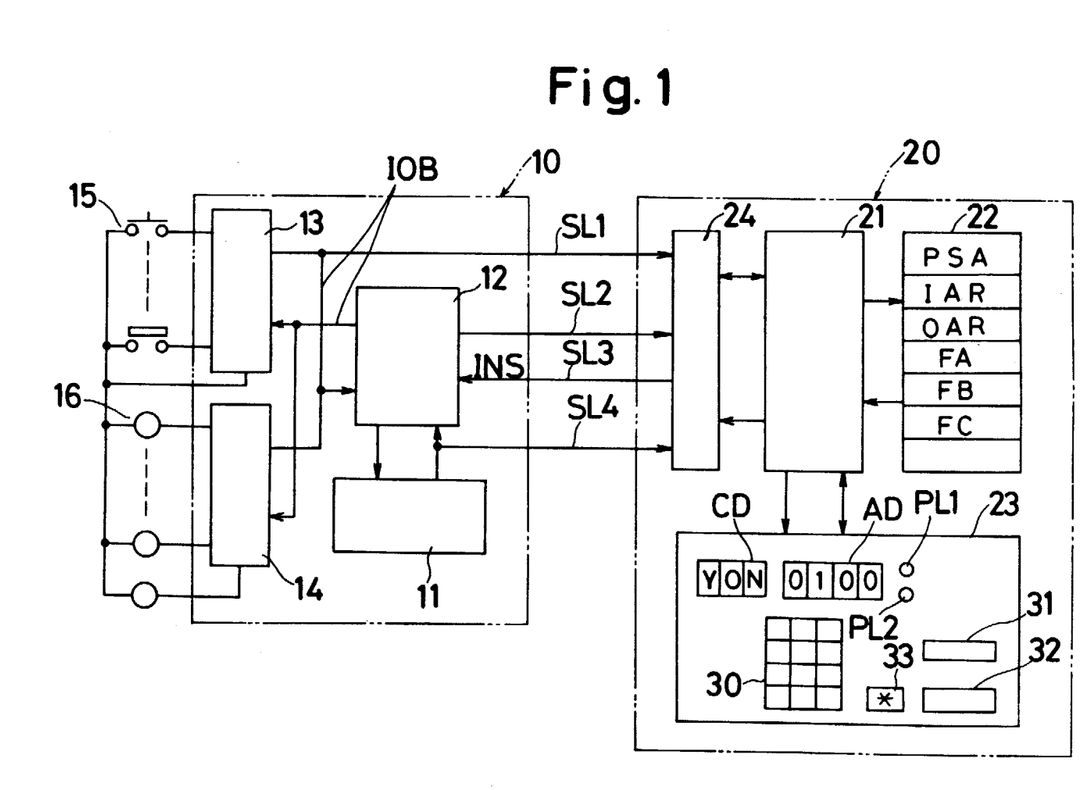
FIG. 1 is a block diagram illustrative of a programmable sequence controller and a display system according to the present invention.

Referring now to the drawings, wherein like reference numerals or characters refer to identical or corresponding parts throughout the several views, and more particularly to FIG. 1, thereof, a programmable sequence controller 10 is shown as comprising a program memory 11, a logic operation and control section 12, and input and output circuit sections 13 and 14. The logic operation and control section 12 is connected to the input and output circuit sections 13 and 14 through lines IOB and is also connected to the program memory 11. The input circuit section 13 is connected to input elements 15, such as limit switches, and the output circuit section 14 is connected to output elements 16, such as relays. The program memory 11 has stored therein a sequence program which includes a number of input and output instructions, as will be described below. The program memory 11 has many memory cells with memory addresses in a regular order. The instruction, which is a binary code made up of a plurality of bits such as, for example, 8 or 16 bits, is stored in each memory cell. Each instruction is composed of a command part for instructing a sequence control operation and an operand containing address data for selecting one of the input and output elements. The command part is written by the use of command words shown in the following TABLE.

TABLE

| Command Word | Meaning |
|---|---|
| TNA | Test if a designated I/O element is ON and obtain a test result AND'ed with a previous test result |
| TFA | Test if a designated I/O element is OFF and obtain a test result AND'ed with a previous test result |
| TNO | Test if a designated I/O element is ON and obtain a test result OR'ed with a previous test result |
| TFO | Test if a designated I/O element is OFF and obtain a test result OR'ed with a previous test result |
| TNE | Test if a designated I/O element is ON, obtain a test result OR'ed with a previous test result, and incorporate the test result into a previous AND test result |
| TFE | Test if a designated I/O element is OFF, obtain a test result OR'ed with a previous test result, and incorporate the test result into a previous AND test result |
| YON | Energize a designated output element if the test result is satisfied |

In the command words, there are test commands (TNA through TFE), and an output command (YON). Each input instruction is composed of one test command and each output instruction is composed of one output command. An example of input and output instructions are TNO 100 and YON 200, respectively. A series of several instructions define a sequence block and are stored orderly in the memory cells having a series of memory addresses. The sequence block is composed of one output instruction and at least one input instruction. Accordingly, the sequence program consists of a number of such sequence blocks.

The logic operation and control section 12 is operated in accordance with the sequence program stored in the memory 11, so that a series of sequence control operations are executed by repeatedly performing tests on the input and output elements 15 and 16 connected to the input and output circuit sections 13 and 14. The energization and deenergization of the output elements 16 is based upon results of the tests. The logic operation and control section 12 also has the function of accepting an interrupt signal INS from an external device, as described below, so as to halt the execution of the sequence control operations for sending the sequence program stored in the program memory 11 or the on-off state of the input and output elements 15 and 16 to the external device.

For the external device, there is provided a display system 20 according to the present invention, which is arranged to display a desired sequence instruction and the on-off state of the corresponding input or output element. The display system 20 is composed of a data processor 21, which may be implemented by means of a general purpose digital computer, a buffer memory 22, and a manipulation and display unit 23. The display system 20 is connected to the sequence controller 10 through an interface 24 and lines SL1, SL2, SL3 and SL4. The manipulation and display unit 23, connected to the data processor 21, comprises numeric keys 30, a read-out key 31, a search key 32, and a contact key 33, and further comprises a command display device CD, an address data display device AD, an on-off state indicator PL1 and an input instruction indicator PL2. The buffer memory 22, connected to the data processor 21, comprises a sequence program storage area PSA for storing the sequence program, an input address register IAR, an output address register OAR and several flags FA, FB and FC, described below.

Figure 2:
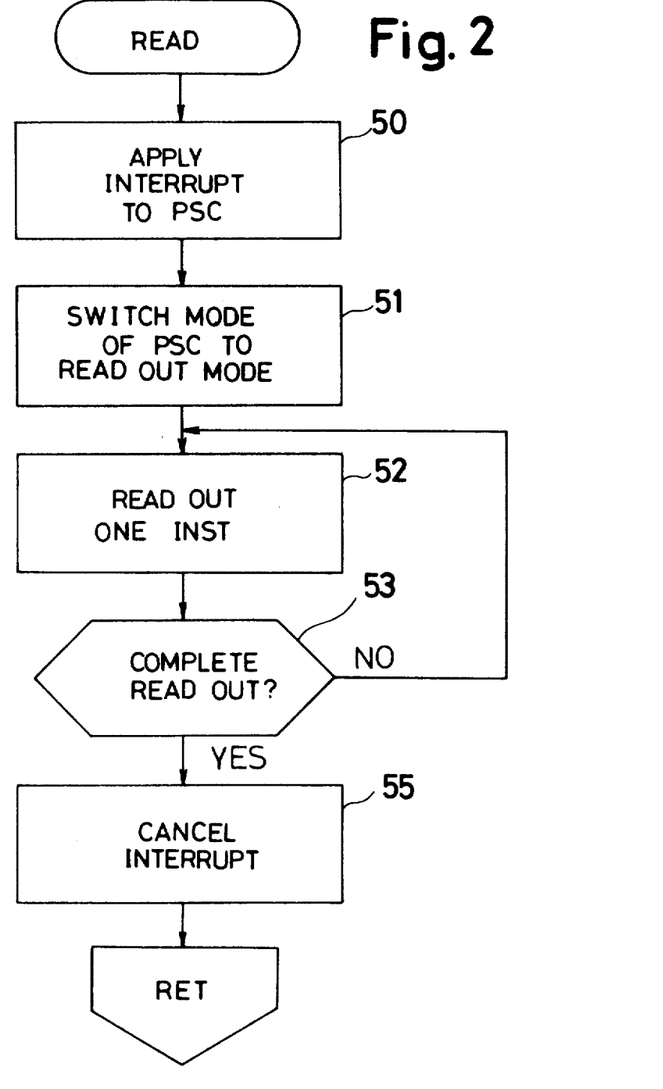
FIG. 2 is a flow chart illustrating the processing operation that a data processor shown in FIG. 1 performs to transfer the sequence program from a program memory of the programmable sequence controller to a buffer memory of the display system.

Preparatory to the processing operations of the data processor 21 for display, the sequence program stored in the program memory 11 is transferred to the buffer memory 22. When the read-out key 31 is depressed, the data processor 21 executes steps 50–55 of a read-out routine READ, shown in FIG. 2, so as to apply the interrupt signal INS to the operation and control section 12 of the controller 10 to store in the program storage area PSA of the buffer memory 22 the whole of the sequence program which is stored in the program memory 11. More particularly, when the interrupt signal INS is applied to the operation and control section 12 in step 50, the mode of the operation and control section 12 is changed in step 51 to the read-out mode so as to halt the execution of the sequence control operations and to send in step 52 one sequence instruction from the memory 11 to the program storage area PSA to thereby store the same therein. The execution of step 52 is repeated until the whole sequence program is ascertained in step 53 to be stored in the program storage area PSA. Then the interrupt signal INS is cancelled in step 55. Next, the processing of the data processor 21 returns to a main routine.

After the storage of the sequence program in the buffer memory 22, the data processor 21 carries out a display routine DIS shown in FIGS. 3(a) through 3(f) including first, second and third operations, discussed below, when some of the numeric keys 30, the search key 32, and the contact key 33 are selectively depressed.

Figure 4:
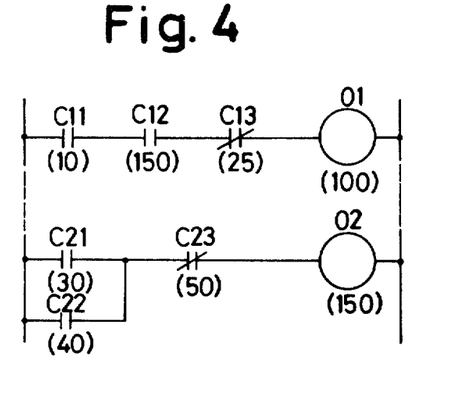
FIG. 4 shows an example of relay circuits.
Figure 5:
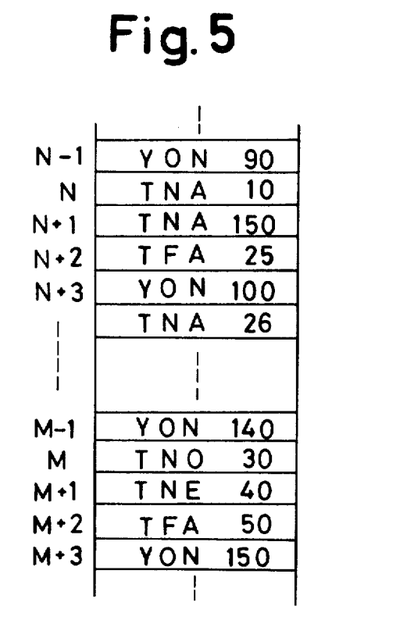
FIG. 5 is an explanatory view illustrating the detail of a program storage area PSA of the buffer memory and a sequence program stored therein.

The processing of the data processor 21 will be explained hereinafter, taking an example of a relay circuit and the corresponding sequence program shown in FIGS. 4 and 5.

When an output element 01 having an address data 100 is not energized, the operator starts to locate an input element which concerns the energization of the output element 01. When some of the numeric keys 30 are depressed for address designation of the output element 01 to be checked and then the contact key 33 and the search key 32 are successively depressed, the data processor 21 carries out the first operation to display an output instruction YON 100 corresponding to the output element 01 and the on-off state of the output element 01 in accordance with the steps shown in FIGS. 3(a) through 3(e).

Figure 6A:
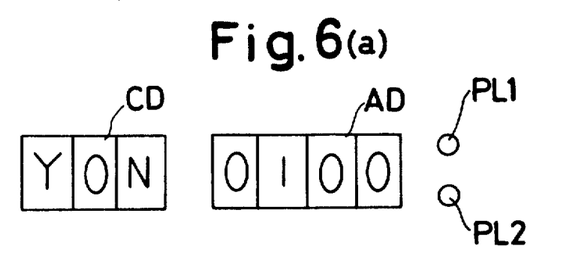

More specifically, when the numeric keys 30 are depressed, the data processor 21 sets the flag FA of the buffer memory 22 in step 61, stores the address data 100 of the output instruction YON 100 in the output address register OAR of the buffer memory 22 in step 62 and displays the address data 100 on the address data display device AD in step 63. Then, when the contact key 33 is depressed, the flag FB of the buffer memory 22 is set in step 66. After the numeric keys 30 and the contact key 33 are depressed successively, when the search key 32 is depressed, the step 68 is reached. In this case, since the flags FA and FB are set, the step 81 is reached to SEARCH the program storage area PSA for the output instruction YON 100 having the address data 100 which is stored in the output address register OAR, while the flags FA and FB are reset in steps 69 and 80. If the output instruction YON 100 is not found for some reason, the input instruction indicator PL2 is lit in step 83 to inform the operator of the situation. However, if found, the address data 200 is displayed on the address display device AD in step 85. In this case, the address data 200 has already been displayed in step 63, therefore no change can be observed. Next, step 86 is executed to send the interrupt signal INS to the operation and control section 12 so as to halt the sequence control operations. Then, the data processor 21 reads out in steps 87 and 88 through the operation and control section 12 the on-off state of the output element 01, whose address data 200 has been displayed on the device AD. In this case, the on-off state indicator PL1 remains to be extinguished in step 90, because the output element 01 is in the off state, but, if it is in the on state, the indicator PL1 is caused to be lit. Accordingly, the operator can recognize whether the output element 01 is in the on state or not. The interrupt signal INS is cancelled in step 91. The following steps 92 and 93 involve displaying the command word of the instruction on the command display device CD. The command word YON of the output instruction YON 100 is converted in step 92 into symbol pattern designation data, and is applied in step 93 to the command display device CD for displaying the same thereon. In step 96, the flag FC is caused to be set, because, in this case, the displayed command YON is ascertained in step 95 to be an output command. Accordingly, the desired output instruction YON 100 and the on-off state of the corresponding output element 01 are displayed, as shown in FIG. 6(a).

Next, the operator depresses only the search key 32. With the search key 32 depressed, the data processor 21 is caused to carry out the second operation for displaying an input instruction which concerns the energization of the output element 01 of the displayed output instruction YON 100.

Figure 3A:
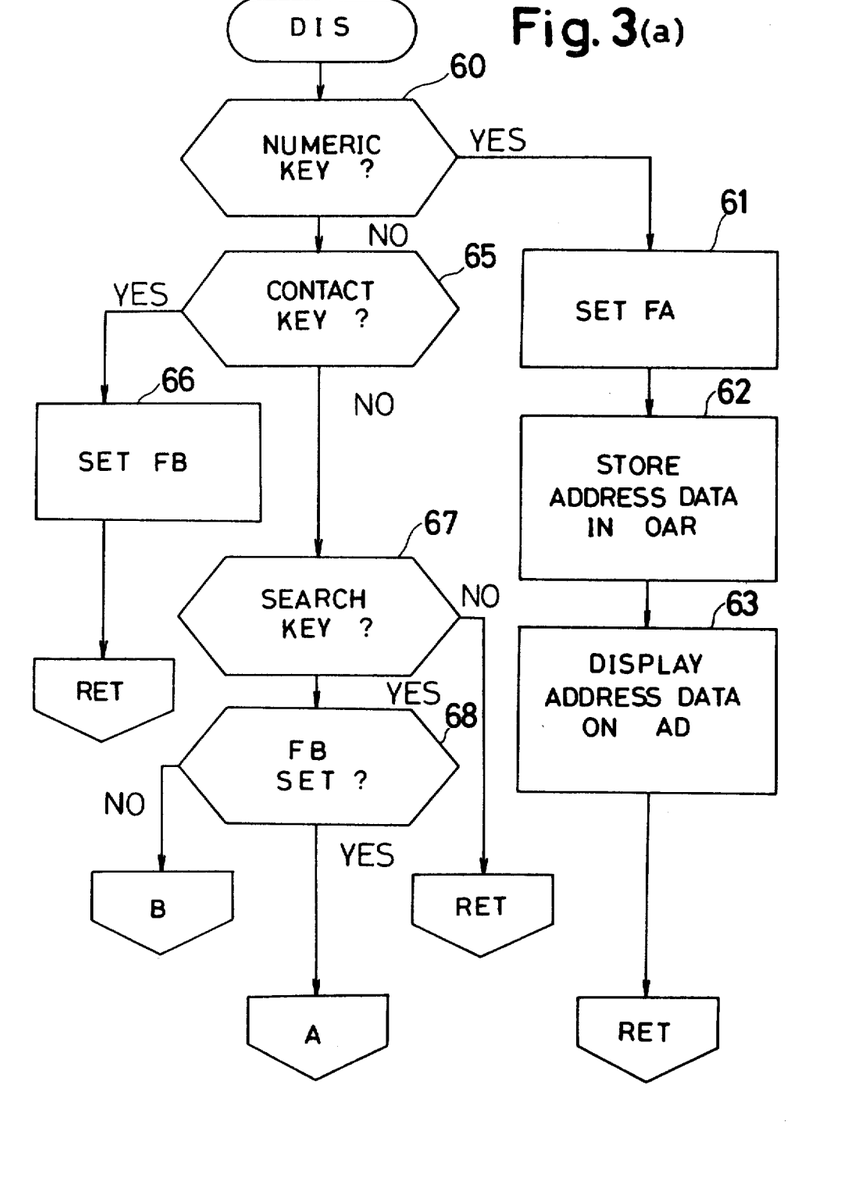
FIGS. 3(a) through 3(f) are flow charts illustrating the processing operations that the data processor performs to display a desired sequence instruction and the on-off state of the corresponding input or output element.
Figure 3B:
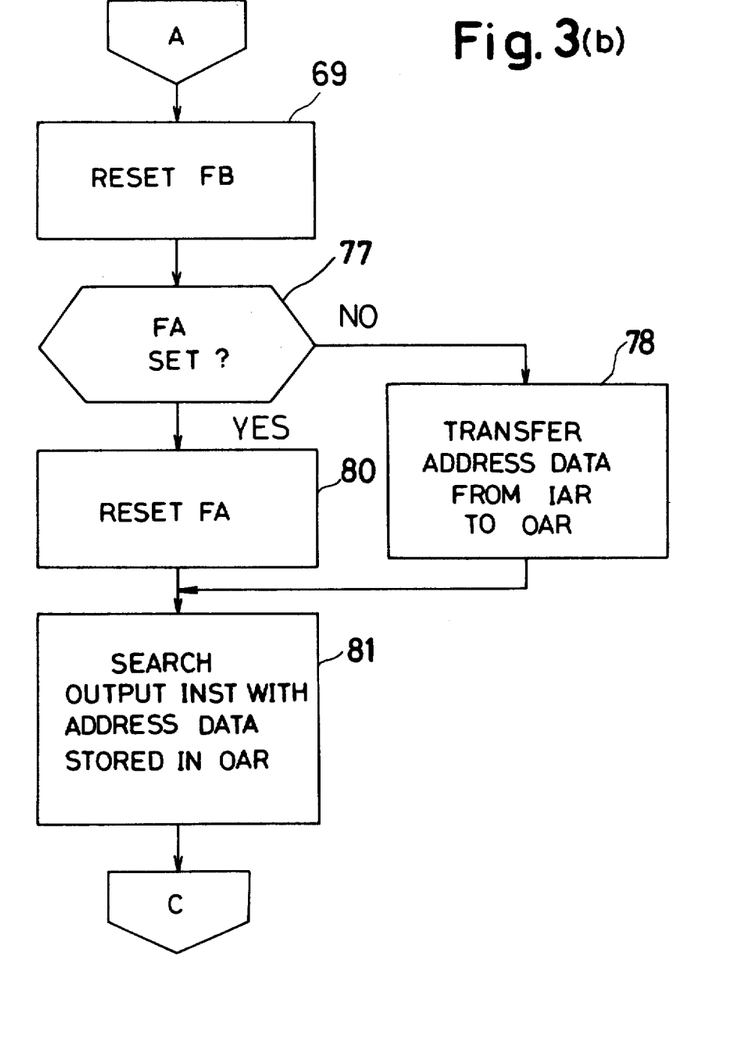
Figure 3C:
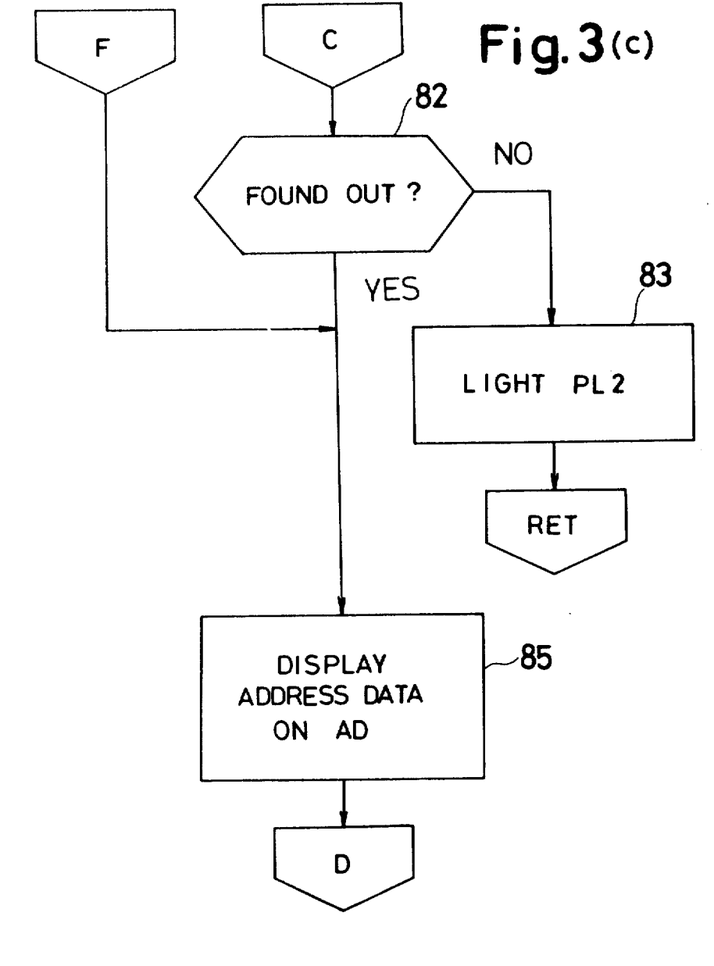
Figure 3D:
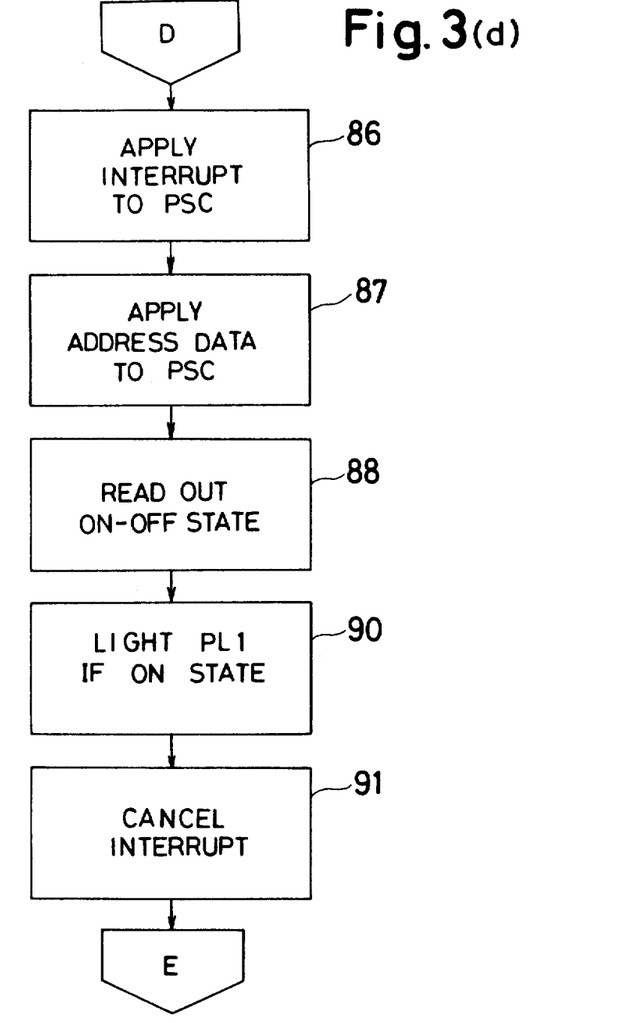
Figure 3E:
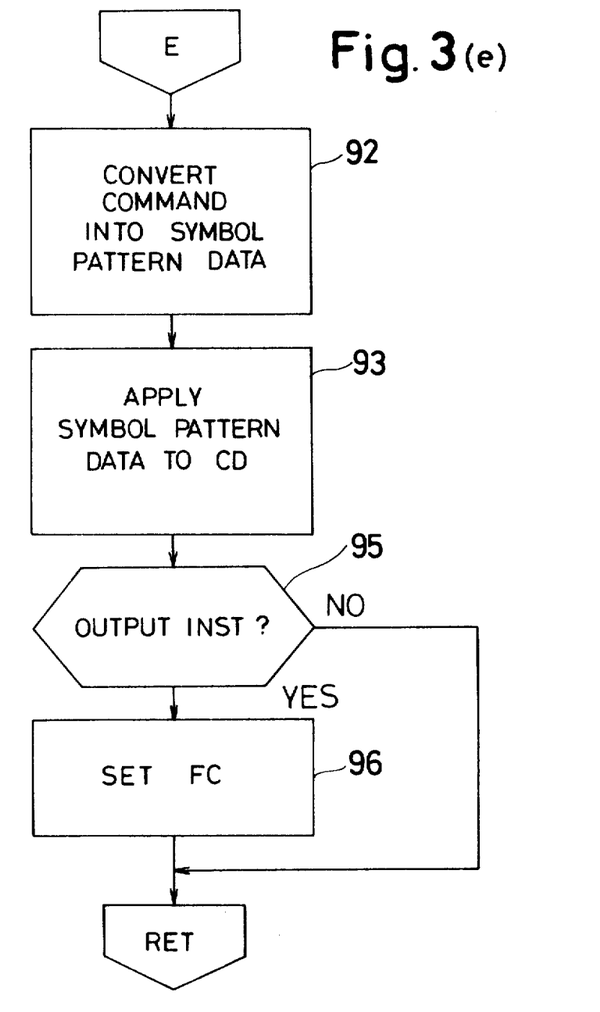
Figure 3F:
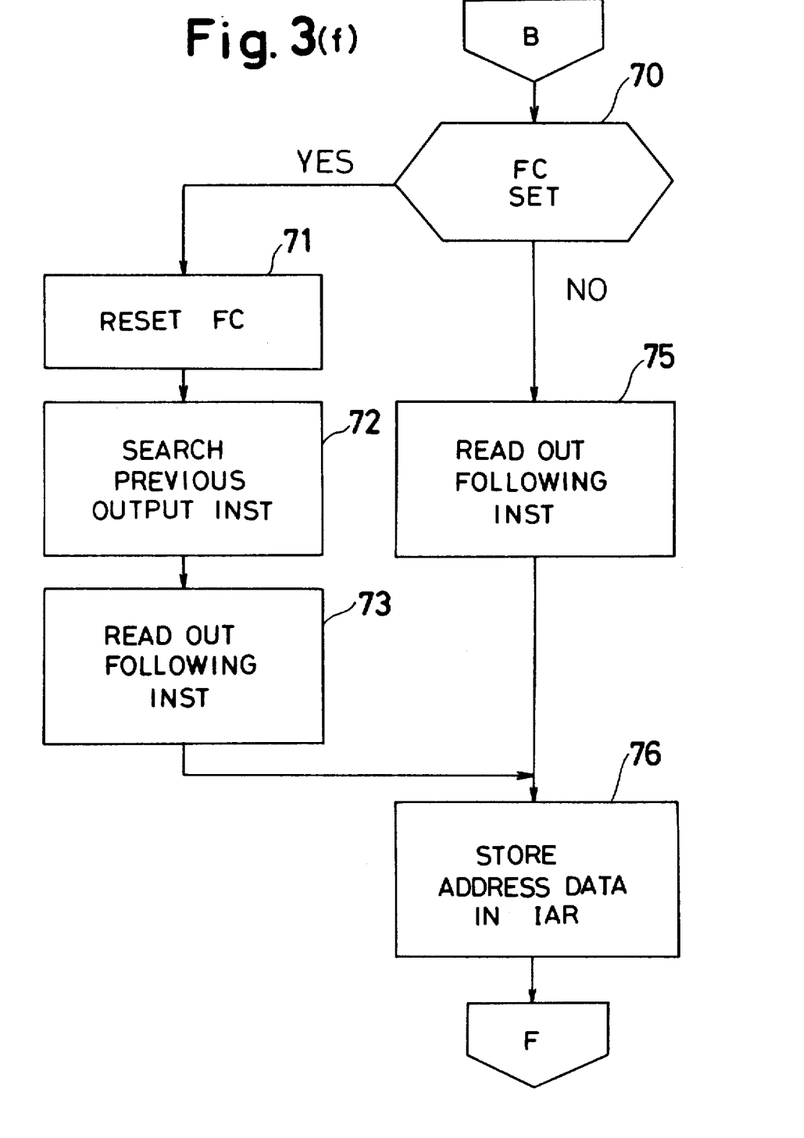
Figure 6B:
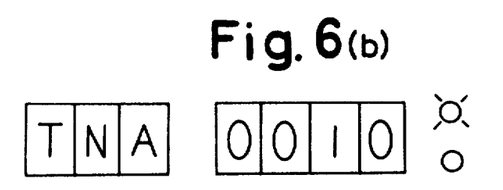

More specifically, when the search key 32 is depressed, the processing of the data processor 21 is advanced to step 71 shown in FIG. 3(f) from step 68, because the flag FB has been reset and the flag FC has been set. The data processor 21 resets in step 71 the flag FC and searches in step 71 the program storage area PSA for an output instruction YON 90 which is stored previous to the output instruction YON 100 whose address data is stored in the output address register OAR. Then the data processor 21 reads out in step 73 an input instruction TNA 10 which is stored following the searched output instruction YON 90. The address data 20 of the input instruction TNA 20 is stored in step 76 in the input address register IAR. Subsequently, the processing of the data processor 21 is advanced to steps 85-96 again, so that the input instruction TNA 10 and the on-off state of the corresponding input element C11 are displayed, if, for example, the input element C11 is in the on-state, as shown in FIG. 6(b). In this case the flag FC is not caused to be set in step 96, because the displayed instruction TNA 10 is an input instruction.

Accordingly, since the indicator PL1 indicates the on-off state of the input element C11, the operator is able to determine whether the input element C11 is satisfied with the test command TNA of the input instruction TNA 10. If the operator finds the input element C11 to be satisfied, it is recognized that there must be another element which prevents the output element 01 from being energized.

Figure 6C:
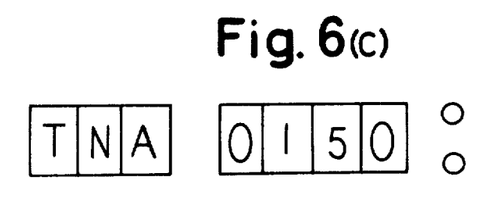

In order to pursue the cause of deenergization of the output element 01, the operator depresses the search key 32 once more. In this case, as the flag FC has been reset, the processing of the data processor 21 advances to step 75 shon in FIG. 3(f) to read out an input instruction TNA 150 which is stored following the input instruction TNA 10. The address data 150 of the read-out instruction TNA 150 is stored in the input address register IAR in step 76, thereby changing the content of the register IRA from 20 to 50. Then, the input instruction TNA 150 and the on-off state of the corresponding input element C12 are displayed as shown in FIG. 6(c), through the execution of steps 85-96. It is noted that the flag FC is not caused to be set in step 96, because the displayed instruction TNA 150 is not an output instruction.

By doing this, if the indicator PL1 has not been lit, the operator recognizes that the input element C12 is in the off state and is not satisfied with the test command TNA of the corresponding input instruction TNA 150. Then, in order to check whether the input element C12 acts as an output element in another sequence block, the operator depresses the contact key 33 and the search key 32 successively to instruct the data processor 21 to carry out the third operation for searching and displaying an output instruction YON 150 having the address data 150 which is stored in the input address register IAR.

More particularly, when the contact key 33 is depressed, the flag FB is set in step 66. Subsequently, when the search key 32 is depressed, the processing of the data processor 21 is advanced to step 69 to reset the flag FB and to step 78 through 77, because the flag FA has not been set. In step 78, the address data 150 stored in the input address register IAR is transferred to the output address register OAR. Then, the data processor 21 in step 81 searches the program storage area PSA for the output instruction YON 150 having the address data 150 which is stored in the register OAR. If the output instruction YON 150 is not found, the input instruction indicator PL2 is lit in step 83, so that the operator recognizes that the input element C12 corresponding to the input instruction TNA 150 prevents the energization of the output element 01.

Figure 6D:
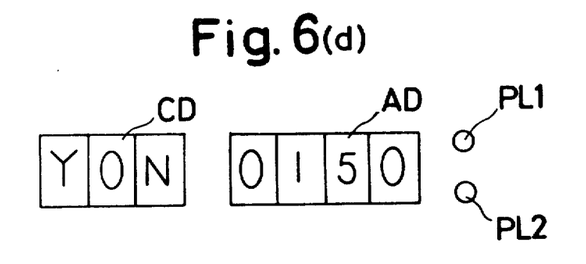
Figure 6E:
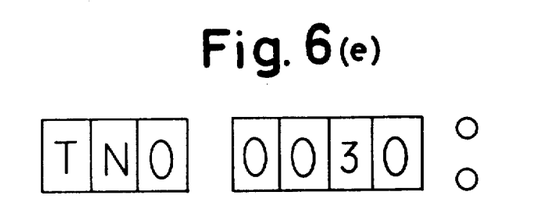
Figure 6F:
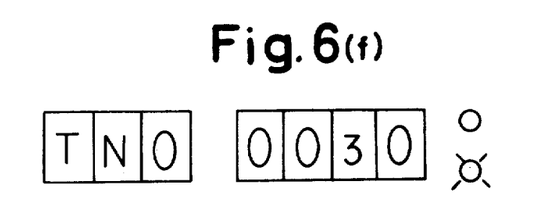

However, if the output instruction YON 150 is found in step 81, the instruction YON 150 and the on-off state of the corresponding output element 02 are displayed, as shown in FIG. 6(d), through the execution of steps 85–96. Subsequently, the operator depresses the search key 33 for instructing the data processor 21 to carry out the second operation to thereby display an input instruction TNO 30 and the on-off state of the corresponding input element C21, as shown in FIG. 6(e). Then, if the input element C21 is satisfied with the command TNO of the input instruction TNO 30, the operator depresses the search key 33 repeatedly until he finds an unsatisfied input instruction. To the contrary, if the input element C21 is not satisfied, the operator depresses the contact key 33 and the search key 32 successively to instruct the data processor 21 to carry out the third operation so as to check whether there is an output instruction YON 30. If there is not such an output instruction YON 30, the input instruction indicator PL2 is caused to be lit as shown in FIG. 6(f), while the display devices AD and CD remain unchanged, so that the operator can recognize that the input element C21 corresponding to the input instruction TNO 30 is the cause of the machine trouble.

However, if there is an output instruction, the above mentioned second and third operations will be repeated until the operator finds an input element which is the cause of the machine trouble.

Accordingly, the operator is able to find the cause of the machine trouble by a simple manipulation such as depressing the contact key 33 and the search key 32 without designating address data.

It is to be noted that, if only the search key 32 is repeatedly depressed, input instructions and one output instruction, which define a sequence block are repeatedly displayed in turn by means of the flag FC. For example, after an input instruction TFA 25 shown in FIG. 5 is displayed, the output instruction YON 100 is displayed by depressing the search key 32. At the next depression of the search key 32, the input instruction TNA 10 is displayed by executing steps 71–73, because the flag FC has been reset in step 96. Accordingly, the instructions TNA 10, TNA 150, TFA 25 and YON 100 are orderly displayed when the search key 32 is repeatedly depressed. Therefore, it is possible to check the input elements repeatedly by such a simple manipulation.

Figure 7:
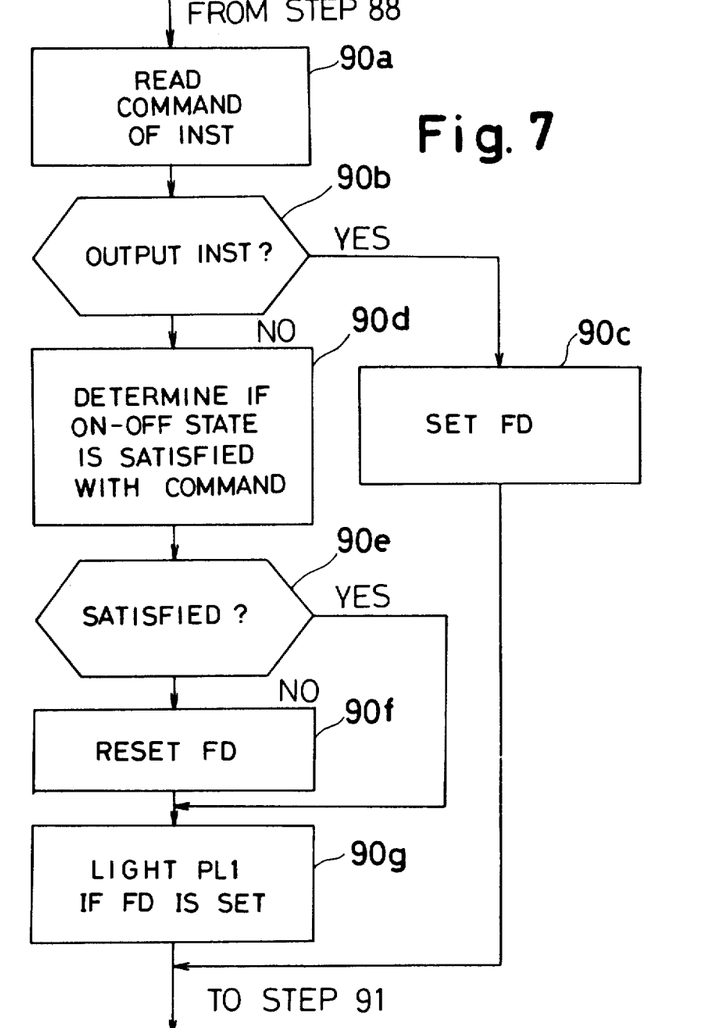
FIG. 7 is a flow chart of another embodiment of the present invention.

FIG. 7 is a flow chart of another embodiment of the present invention which is capable of indicating whether an input element is satisfied with the test command of the corresponding input instruction. The processing steps of this embodiment are modified to have steps 90a–90g instead of the step 90 of the first embodiment of the present invention as described above. The remaining steps are the same as the first embodiment.

Figure 8:
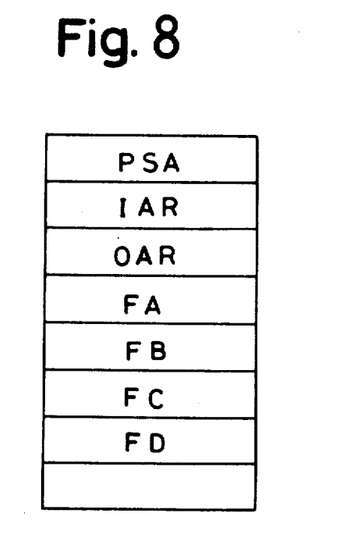
FIG. 8 shows a buffer memory of another embodiment of the subject invention.

When the output instruction YON 100 is designated by the numeric keys 30, the data processor 21 reads in step 90a the command YON of the output instruction YON 100 so as to determine whether it is an output instruction. If it is an output instruction, a test flag FD of the buffer memory 22 shown in FIG. 8 is set in step 90c.

Subsequently, when the input instruction TNA 10 is red out in step 73 by the depression of the search key 32, the processing of the data processor 21 is advanced from step 90b to step 90d to determine whether the on-off state of the input element C11 corresponding to the input instruction TNA 10 is satisfied with the test command TNA of the input instruction TNA 10. If it is satisfied, the indicator PL1 is lit in step 90g, because the flag FD remains to be set. However, if it is not satisfied, the flag FD is reset in step 90f to thereby extinguish the indicator PL1 in step 90g. Accordingly, the operator can recognize the satisfaction or dissatisfaction of an input element with the test command of the corresponding input instruction.

As mentioned above, according to the present invention, the data processor 21 stores the input address data of an input element in the input address register IAR each time the corresponding input instruction is displayed on the display devices AD and CD, searches for an output instruction having the address data which is stored in the input address register IAR when the contact and search keys 33 and 32 are depressed, and reads out an input instruction which concerns the energization of an output element corresponding to the output instruction. Therefore, it is possible for the operator to quickly locate the cause of the machine trouble or to locate an input element which prevents the energization of an output element by a simple manipulation such as depressing the contact and search keys. It is not necessary for the operator to repeatedly designate the address data of the output elements or the corresponding output instructions, in the case where an input element acts as an output element in another sequence block.

Obviously, numerous modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. A sequence instruction display system for use with a sequence controller having a program memory for storing a sequence program composed of a plurality of test and output instructions, said display system comprising:

program storage means;

address designation means manually operable for selectively designating the addresses of input and output elements connected to said sequence controller;

control command means manually operable for selectively generating first, second, third and fourth commands;

instruction display means for displaying said test and output instructions one at a time;

state display means for displaying the ON-OFF state of any one of said input and output elements which is the objective of a test or output instruction being displayed on said instruction display means;

a data processor coupled to said sequence controller, said program storage means, said address designation means, said control command means, said instruction display means and said state display means, including:

first control means responsive to said first command from said control command means for applying an interrupt to said sequence controller so as to transfer said sequence program from said program memory of said sequence controller to said program storage means;

second control means responsive to address data from said address designation means and said second command from said control command means for searching said program storage means for an output instruction having said address data designated by said address designation means so as to display said searched output instruction on said instruction display means;

third control means for searching said program storage means for a number of test instructions which relate to the energization of an output element having said designated address so as to display successively said searched test instructions on said instruction display means when repeatedly given said third command from said control command means;

fourth control means responsive to said fourth command from said control command means for searching said program storage means for an output intruction programmed for operating an output element for which a test instruction is being displayed on said intruction display means, so as to display said searched output instruction on said instruction display means; and fifth control means responsive to said third command from said control command means for applying an interrupt to said sequence controller so as to read the ON-OFF state of any input element for which a test instruction is being displayed on said instruction display means and to display said read ON-OFF state on said state display means.

2. A sequence instruction display system as set forth in claim 1, further comprising:

indication means coupled to said data processor and operable for enabling an operator to ascertain visually whether an input element for which an input instruction is being displayed on said instruction display means is represented by an output element or not;

said fourth control means being also operable for operating said indication means when an output instruction programmed for operating an output element for which a test instruction is being displayed on said instruction display means is not found as a result of searching said program storage means in response to said fourth command.

3. A sequence instruction display system as set forth in claim 2, wherein said control command means comprises:

first, second and third manually operable command keys, said control command means generating said first command when said first key is operated, said second command when said second and third keys are operated in succession, said third command when said third key is operated, and said fourth command when said second and third keys are operated in succession.

4. A sequence instruction display system as set forth in claim 2, wherein said address designation means comprise a set of numeric keys.

5. A seuence instruction display system as set forth in claim 2, wherein said state display means comprises a light emitting indicator.

6. A sequence instruction display system as set forth in claim 2, wherein said indication means comprises a light emitting indicator.

* * * * *